United States Patent

[11] 3,592,279

| [72] | Inventor | Harlan J. Donelson, Jr.<br>Highway 330 West, Marshalltown, Iowa 50158 |
|---|---|---|
| [21] | Appl. No. | 821,001 |
| [22] | Filed | May 1, 1969 |
| [45] | Patented | July 13, 1971 |

[54] SNOW SCOOTER
7 Claims, 10 Drawing Figs.

[52] U.S. Cl. .................................................. 180/5,
180/9.24, 180/25, 305/25
[51] Int. Cl. .................................................. B62m 27/02
[50] Field of Search .......................................... 180/5, 9.24,
9.22, 9.5; 305/25

[56] References Cited
UNITED STATES PATENTS

| 3,101,805 | 8/1963 | Tritle | 180/9.24 |
| 3,336,994 | 8/1967 | Pederson | 180/9.24 |
| 2,046,560 | 7/1936 | Johnson | 180/9.22 |
| 2,519,745 | 8/1950 | Danielson | 180/9.22 |
| 3,077,238 | 2/1963 | Nelson | 180/9.24 X |
| 3,193,039 | 7/1965 | Sutton | 180/25 |
| 3,318,403 | 5/1967 | Hansen | 180/5 |
| 3,318,407 | 5/1967 | Deardorff | 180/9.24 |

Primary Examiner—Richard J. Johnson
Attorney—Henderson & Strom

ABSTRACT: This invention relates to a motorized snow scooter which is readily convertible to a conventional motor scooter and which comprises a frame having steering means and drive means mounted thereon. Two rear wheels, mounted in tandem, and a guide means are also mounted on the frame. A demountable, endless track is rotatably and demountably engaged with the rear wheels and the guide means.

INVENTOR
HARLAN J. DONELSON, JR.
BY
Henderson & Strom
ATTORNEYS

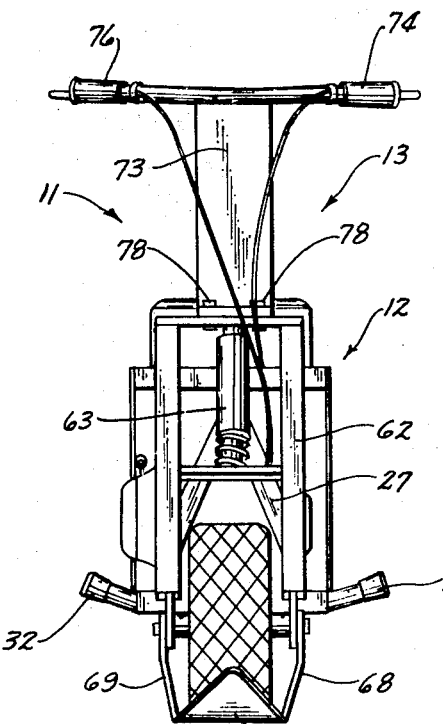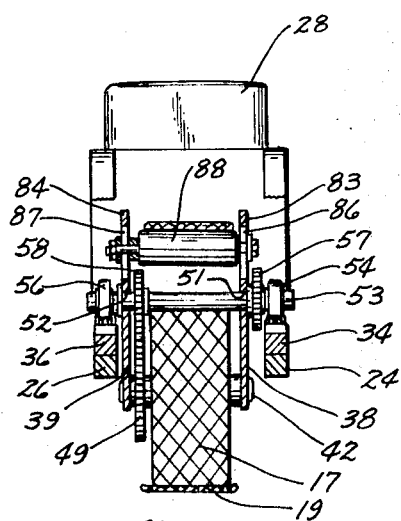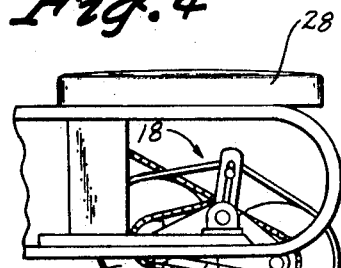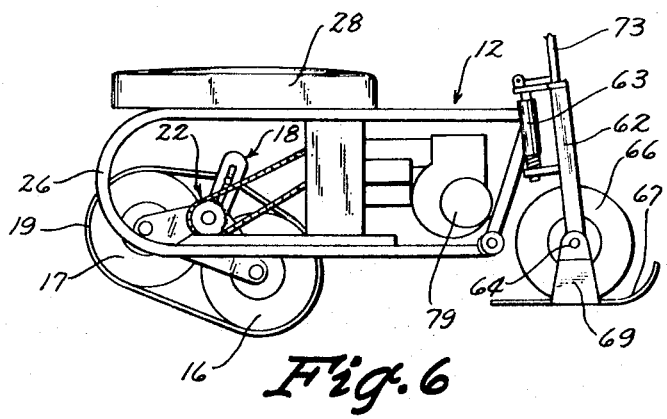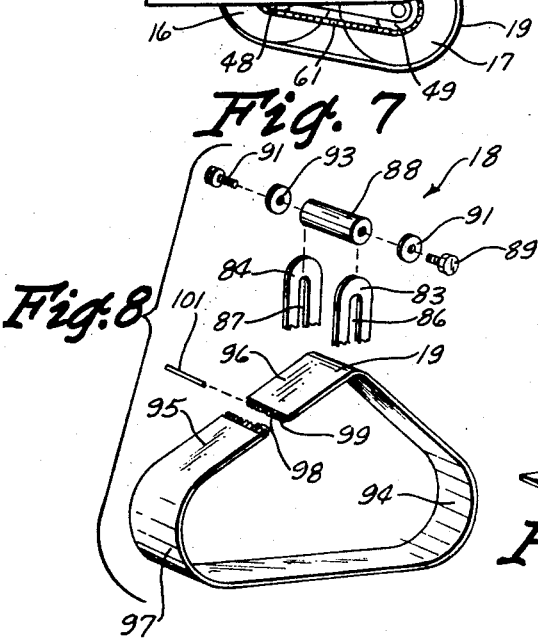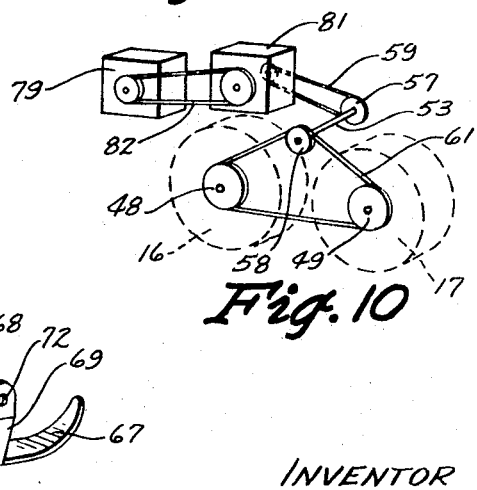

3,592,279

1

SNOW SCOOTER

BACKGROUND OF THE INVENTION

This invention relates to a motorized snow scooter which can be readily converted to a conventional motor scooter. A demountable, endless track is rotatably engaged with two tandemly disposed rear wheels to provide motive power for this snow scooter.

Snowmobiling has become a popular winter sport in the United States. A number of snow vehicles, utilized for recreational purposes, have recently been patented among which are Jarvi, U.S. Pat. No. 3,148,743; Nelson, U.S. Pat. No. 3,077,238; Wheeler, U.S. Pat. No. 3,199,620; Howes, U.S. Pat. No. 3,011,576; Skullerud, U.S. Pat. No. 2,914,126; and France, U.S. Pat. No. 2,749,189. All of these devices can be utilized for transportation and recreation on the snow. In absence of snow, however, the vehicles cannot be used.

One attempt has been made to provide a vehicle which can be utilized as a snow vehicle and which can be used for more conventional land transportation. This attempt is described in Hansen, U.S. Pat. No. 3,318,403. To convert this device from a snow vehicle to an ordinary wheeled vehicle, a cumbersome tracked device must be detached from the motorcycle and the rear wheel of the motorcycle must then be reattached. Because of the complicated nature of this tracked device, little monetary saving can be realized over a more conventional snowmobile.

The snow scooter of this invention alleviates the above described problems. The snow scooter of this invention is relatively inexpensive and can be converted from a conventional scooter to a snow scooter in a matter of a few minutes. The materials and component parts needed for this conversion can additionally be readily carried along with the snow scooter.

SUMMARY OF THE INVENTION

This invention relates to a motorized snow scooter readily convertible to a conventional motor scooter comprising a frame means; steering means affixed to the frame means; drive means mounted on the frame means; two rear wheels mounted in tandem on the frame means and drivably connected to the drive means; guide means aligned with the rear wheels and mounted on the frame means and being adapted to maintain an endless track in aligned engagement with the rear wheels; and an endless track demountably and rotatably engaged with the rear wheels and the guide means. The endless track provides sufficient surface area to support the snow scooter and the driver thereof on the surface of snow.

An object of this invention is to provide a snow scooter of novel and improved construction which is readily convertible to a conventional motor scooter.

Another object is to provide a snow scooter which can be converted to a conventional motor scooter with a minimum of time and component parts.

A further object is to provide a snow scooter having two rear wheels tandemly disposed and having an endless track demountably and rotatably engaged with the rear wheels.

Yet another object is to provide guide means aligned with the rear wheels to maintain the endless track in aligned engagement with the rear wheels.

Still another object is to provide a wheel support member rotatably secured to the main frame carriage for tandemly mounting the rear wheels.

A still further object is to provide an adjustable guide means whereby the tension on the endless track can be regulated.

BRIEF DESCRIPTION OF THE DRAWINGS

FIG. 4 is a front view of the snow scooter.

FIG. 5 is a cross-sectional view of the snow scooter taken along the line 5-5 of FIG. 2.

FIG. 6 is a slightly reduced side view of the snow scooter showing the wheel support member in a partially rotated position.

FIG. 7 is a slightly reduced and abbreviated side view of the snow scooter showing the wheel support member in a partially rotated position.

FIG. 8 is an exploded perspective of the endless track and of a portion of the guide means.

FIG. 9 is a slightly reduced perspective view of the detachable ski member.

FIG. 10 is a schematic of the drive train of the snow scooter.

DESCRIPTION OF THE PREFERRED EMBODIMENTS

Figures 1, 2, 3:
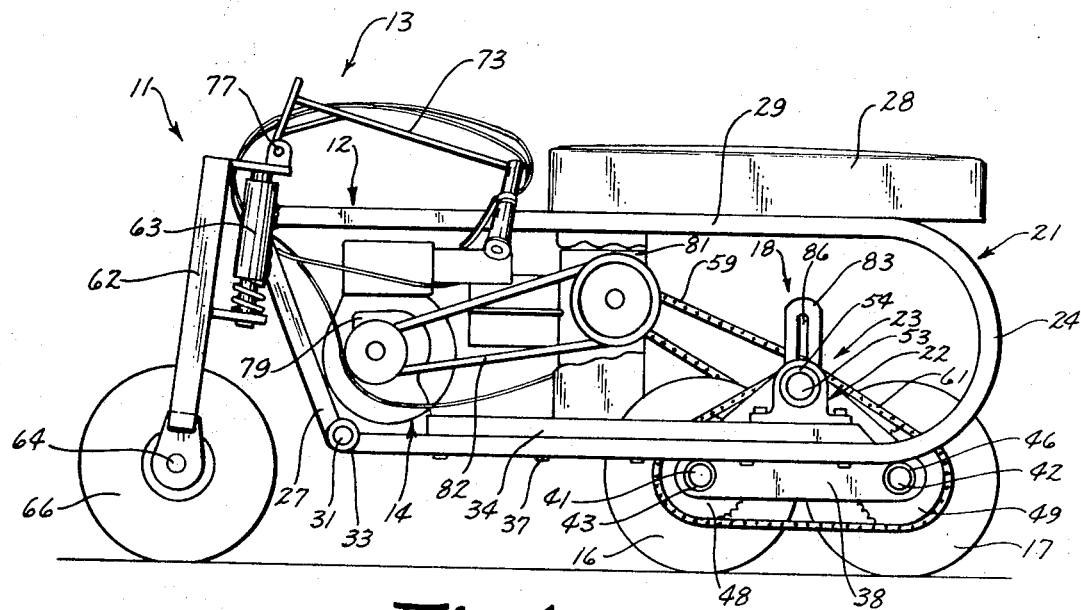
FIG. 1 is a side view of the snow scooter of this invention prepared for conventional land travel and having the steering handle foldably disposed.
FIG. 2 is a side view of the snow scooter prepared for travel over snow.
FIG. 3 is a slightly reduced top view of the snow scooter of FIG. 2.

Referring now to the drawings, the snow scooter of this invention is generally indicated at 11 in FIGS. 1—4. The snow scooter 11 is comprised of a frame means 12; steering means 13 affixed to the frame means 12; and drive means 14 (FIGS. 1 and 2) mounted on the frame means 12. Two rear wheels 16 and 17 are mounted in tandem and proximate each other on the frame means 12 and are drivably connected to the drive means 14. Guide means 18 is aligned with the rear wheels 16 and 17 and is mounted on the frame means 12 and adapted to maintain an endless track (FIGS. 2 and 5) in aligned and rotatable engagement with the rear wheels 16 and 17 and the guide means 18.

More specifically, the frame means 12 (FIGS. 1 and 2) is comprised of a main carriage 21, a wheel support member 22, and mounting means 23 attached to the main carriage 21 and rotatably mounting the wheel support member 22 to the main carriage 21. The main carriage 21 consists of two longitudinally disposed U-shaped members 24 and 26 defining the lateral width of the snow scooter 11 which are joined by a V-shaped member 27 (FIG. 4) at the front ends thereof. A seat 28 (FIGS. 1 and 2) is rigidly affixed to the topmost portion 29 of the U-shaped members 24 and 26. Foot supports 31 and 32 (FIGS. 1, 2 and 4) extend outwardly of the U-shaped members 24 and 26 and are affixed at the lowermost juncture 33 of the U-shaped members 24 and 26 and the V-shaped member 27. Supporting members 34 and 36 are juxtaposed of the upper surface of the lowermost portion of the U-shaped members 24 and 26. The mounting means 23 and a portion of the drive means 12 are affixed by a plurality of nut and bolt means 37 (FIGS. 1 and 2) to the supporting members 34 and 36 and to the U-shaped members 24 and 26. A plurality of lateral supports, not shown, connect the U-shaped members 24 and 26 and add strength to the main carriage 21.

The wheel support member 22 (FIGS. 1, 2 and 5) is comprised of two spaced apart side panels 38 and 39 of generally triangular configuration with two axles 41 and 42 extending therebetween. The axles 41 and 42 are disposed in tandem relation and extend into journal boxes 43, 44, 46 and 47 formed in the side panels 38 and 39 and are adapted to receive and mount the rear wheels 16 and 17 (FIGS. 1 and 2). Mounted rigidly on each axle 41 and 42 and in aligned relation are drive gears 48 and 49 (FIGS. 1, 7 and 10). The upper portion of the side panels 38 and 39 are journaled to form openings 51 and 52 (FIG. 5) therethrough. The openings 51 and 52 are formed in a plane vertically bisecting the distance between the axles 41 and 42 and in a line parallel of the axles 41 and 42.

Mounting means 23 (FIGS. 1, 2 and 5), in a preferred embodiment, is a rotatably mounted drive axle 53. The drive axle 53 extends through and is carried by journal boxes 54 and 56 which are bolted into the main carriage 21. The drive axle 53 also extends through openings 51 and 52 in the side panels 38 and 39 and, thereby, rotatably mounts the wheel support member 22. By rotatably mounting the wheel support member 22, both of the rear wheels 16 and 17 will constantly be in contact with the surface of the ground regardless of the terrain features. This rotatable feature is demonstrated in FIGS. 6 and 7. When the endless track 19 is mounted on the rear wheels 16 and 17, the track 19 will also be in constant engagement with the surface of the ground. The track 19 rotates with the wheels 16 and 17 and supplies motive power to the snow scooter 11.

Two drive gears 57 and 58 (FIG. 5) are mounted on opposite ends of the drive axle 53. The first drive gear 57 (FIG. 2) is drivably connected to the drive means 14 by chain drive 59. A second chain drive 61 (FIGS. 1 and 5) drivably connects the second drive gear 58 with the drive gears 48 and 49 mounted respectively on axles 41 and 42 of the wheel support member 22.

Steering means 13 is generally rotatably affixed at the front portion of the frame means 12. The steering means 13 comprises a bifurcated steering arm 62 (FIGS. 1 and 2) rotatably attached in a generally upstanding position to the main carriage 21. A shock absorbing spring 63 can be utilized with the steering means 13 to provide a smooth and comfortable ride. A front axle 64 is formed on the lower portion of the steering arm 62 and a front wheel 66 is rotatably mounted thereon. A ski member 67 (FIG. 2) is detachably affixed to the front axle 64. The ski member 67 (FIG. 9) has upstanding side elements 68 and 69 formed on opposite sides of the ski member 67 with apertures 71 and 72 formed through the side elements 68 and 69 adapted to receive the front axle 64.

Extending upwardly of the steering arm 62, is a steering handle 73 (FIGS. 2 and 5) of generally T-shaped configuration and having oppositely disposed handle grips 74 and 76. Throttle and brake means are provided in conjunction with said steering handle 73 and handle grips 74 and 76 in a conventional manner. The steering handle 73 is foldably affixed to the steering arm 62 by a hinge 77 (FIG. 1). With the steering handle 73 folded down, the snow scooter 11 can more readily be transported from place to place. The steering handle 73 is secured in operative position by nut and bolt means 78.

The drive means 14 for this snow scooter 11 is generally a small internal combustion engine 79 (FIGS. 1 and 2) of conventional manufacture. The engine 79 is mounted on the main carriage 21 and is drivably connected to a torque converter 81 by a belt 82. The torque converter 81 is, in turn, drivably connected by a chain 59 to the drive axle 53. By utilizing a torque converter 81, constant shifting of gears is eliminated.

The guide means 18 is preferably rigidly mounted on the wheel support member 22 and rotates therewith. The guide means 18 is adjustable to facilitate regulation of the tension on the endless track 19.

As shown more specifically in FIGS. 1, 2 and 5, the guide means 18 is comprised of two spaced apart struts 83 and 84 rigidly affixed in an upstanding position to, respectively, the side panels 38 and 39 of the wheel support member 22. The struts 83 and 84 are disposed in generally vertical planes and are proximate opposite side edges of the endless track 19. Each of the struts 83 and 84 have longitudinal slots 86 and 87 formed therein which are aligned to receive and adjustably mount a cylinder 88 (FIGS. 5 and 8). The cylinder 88 is normally disposed in a horizontal plane and is vertically adjustable. The cylinder 88 (FIG. 8) is tapped at its ends to receive capscrews 89 and 91 to thereby adjustably secure the cylinder 88 to struts 83 and 84. Washers 92 and 93 are utilized to provide additional surface area with concomitant additional gripping ability. Preferably, the cylinder 88 is rotatable and of sufficient length to engage the full width of the endless track 19.

The cylinder 88 (FIG. 8) can be adjusted upwardly in slots 86 and 87 to provide sufficient tension on the endless track 19 to prevent slippage of the rear wheels 16 and 17 on the inner surface 94 of the endless track 19. With the cylinder 88 properly adjusted, the track 19 rotates at the speed at which the wheels 16 and 17 are rotating. The track 19, of course, provides additional surface area for support of the snow scooter 11 on the snow and provides a surface engaging means for traveling on snow. Additionally, the cylinder 88 can be moved downwardly to facilitate mounting and removal of the endless track 19 on the rear wheels 16 and 17.

The endless track 19 used herein can be manufactured from any strong, flexible, wear-resistant material. Natural and synthetic rubber products are readily available and convenient for use herein. The track 19 is comprised of a length of the aforedescribed strong, flexible, wear-resistant material having two ends 95 and 96 and a lateral width approximately the same as the lateral tread width of the rear wheels 16 and 17. The track 19 is sufficiently long to pass over the cylinder 88 of the guide means 18 and around the rear wheels 16 and 17 as illustrated in FIG. 2. The outside surface 97 of the track 19 can be provided with lugs or cleats (not shown) to increase traction for this snow scooter 11.

A plurality of retaining elements 98 are affixed to the ends 96 and 97 of the track 19. Each of the retaining elements 98 has an opening 99 formed laterally therethrough. The retaining elements 98 are affixed to the ends 96 and 97 of the track 19 in mating relation. More specifically, the retaining elements 98 mate or mesh and the openings 99 formed through the retaining elements 98 are then aligned to receive a pin 101. The pin 101, when extended through the openings 99 of all the retaining elements 98, forms the length of track into the endless track 19 used herein. The pin 101 can be secured by any convenient method in the retaining elements 98.

The endless track 19 can readily be installed in the snow scooter 11 by threading the endless track over the cylinder 88 of the guide means 18 and around rear wheels 16 and 17. The pin 101 is placed through openings 99 and the cylinder 88 is adjusted upwardly to provide proper tension on the endless track.

Although a preferred embodiment has been described hereinbefore, it is to be remembered that various modifications may be made without departing from the invention as defined in the appended claims.

I claim:

1. A motorized snow scooter readily convertible to a conventional motor scooter comprising:
    a main carriage including a pair of spaced frame members;
    steering means affixed to said main carriage;
    drive means mounted on said main carriage;
    a wheel support member having two axles rotatably mounted in tandem thereon;
    a drive axle attached to said main carriage rotatably mounting said wheel support member at a position intermediate axles to said main carriage, said drive axle being drivably connected to said drive means and drivably connected to said axles formed on said wheel support;
    two rear wheels mounted in tandem between said frame member on said axles of said wheel support member;
    guide means aligned with said rear wheels and mounted on said wheel support member, said guide means including a roller element mounted on an axis above said drive axle to engage the inner surface of an endless track to maintain said endless track in aligned engagement with said rear wheels, said roller element being adjustable to regulate the tension on said endless track;
    an endless track demountably and rotatably engaged with said rear wheels and said guide means.

2. The snow scooter of claim 1 wherein said guide means is comprised of:
    two struts having longitudinal slots formed therein rigidly affixed to said wheel support member, said struts being spaced apart and disposed in generally vertical planes proximate opposite side edges of said endless track; and
    a cylinder normally horizontally disposed, vertically adjustable, and rotatably engaged at its ends in said slots formed in said struts.

3. The snow scooter of claim 2 wherein said endless track is comprised of:
    a length of track having two ends;

retaining elements affixed in mating relation to said ends of said track; said retaining elements having openings formed laterally therethrough;

pin means extending through said openings in said retaining elements and detachable secured therein.

4. The snow scooter of claim 3 wherein said wheel support member is rotatably mounted on said drive axle, said drive axle being disposed in parallel relation to said axles formed on said wheel support member and in a plane vertically bisecting the distance between said axles.

5. The snow scooter of claim 4 wherein said steering means comprises:

a steering arm rotatably attached in a generally upstanding position to the front of said main carriage, said steering arm having a front axle formed on the lower portion thereof;

a front wheel rotatably mounted on said front axle; and a ski member having upstanding side elements formed on opposite side edges thereof, said side elements having apertures formed therethrough adapted to receive said front axle, said ski member being detachably mounted through said apertures on said front axle.

6. The snow scooter of claim 5 wherein a steering handle having a generally T-shaped configuration is foldably attached at the bottom portion of said T-shaped configuration to said steering arm.

7. The snow scooter of claim 5 wherein said length of track is approximately the same lateral width as the lateral width of the rear wheels.